United States Patent Office

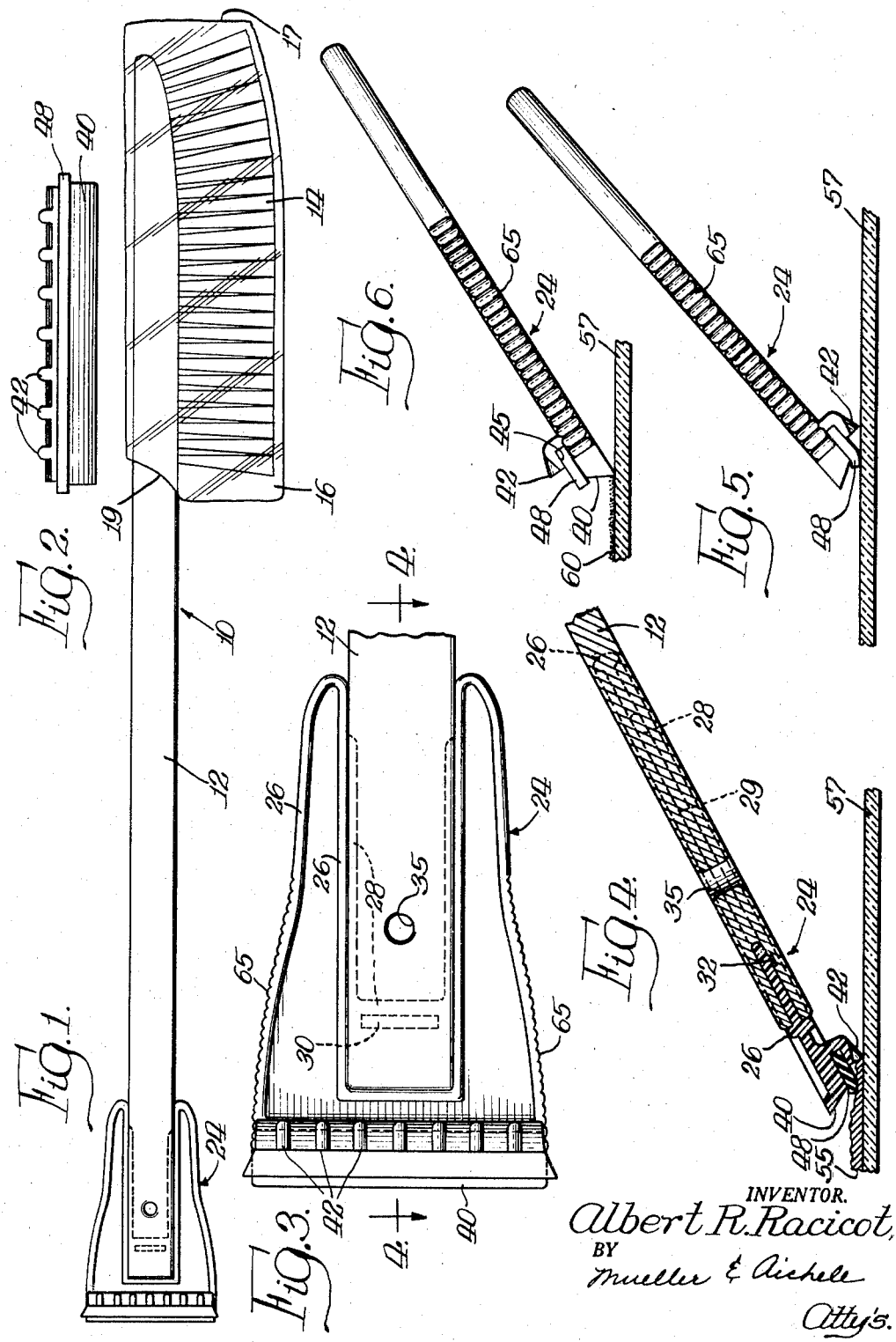

2,856,621
Patented Oct. 21, 1958

2,856,621

SCRAPER AND SQUEEGEE DEVICE FOR CLEARING WINDOWS OF SNOW AND ICE

Albert R. Racicot, Aurora, Ill., assignor to National Brush Company, Aurora, Ill., a corporation of Illinois Application June 8, 1955, Serial No. 514,091

2 Claims. (Cl. 15—105)

This invention relates to snow and ice removal devices, and more particularly to a device for manually removing ice, snow and moisture from window glass, or the like.

There are various instances in which it is necessary to provide clear vision through window glass, and one of the most important is in the maintenance of clear windshields on vehicles. It is well known that in the colder climates snow and ice accumulate on the windshields of autos in various quantities and removal is necessary in order that the vehicle can be safely operated. The deposits of foreign matter may take several forms ranging from hard ice to slush, or partly melted snow, and there may, of course, be mud or dirt along with such snow and ice, all of which an operator of the vehicle would desire to remove from the window glass for safety in driving. However, normally different tools are required depending upon the material deposited on the windshield and on the rear window of the car. This complicates the problem of retaining the tools in the car and handy for use.

It is an object of this invention to provide a surface cleaning device which permits rapid and efficient removal from a surface of such deposits indicated above, including ice, snow and moisture, as well as dirt mixed therewith.

Another object is to provide a simple, inexpensively constructed surface cleaning device in one unit for manually scraping, breaking up, or squeegeeing foreign matter from automobile windshields with the mode of operation being determined by the angle at which the device is held with respect to the surface to be cleaned.

A feature of the invention is the provision of an improved snow and ice removal tool for auto windshields including an elongated handle with a scraping member removably supported at the free end thereof, and the scraping member including a pliant squeegee member to provide a combination handle and scraping device for removal of snow, ice, moisture and the like.

Another feature of the invention is the provision of an improved squeegeeing and scraping member adapted for removing snow and ice from an auto windshield, and having a beveled scraping edge, sharp transverse rib portions spaced from the beveled edge, and a pliant squeegee member on one end of the device, all of which may be used alternatively depending upon whether snow, ice, slush, or the like must be removed from an automobile windshield, or window.

Further objects, features and the attending advantages thereof will be apparent upon consideration of the ensuing description, when taken in conjunction with the accompanying drawing in which:

Fig. 1 is a side view of the complete surface cleaning device in reduced size from a commercial embodiment of the invention;

Fig. 2 is an end view of the device with the brush removed;

Fig. 3 is a top view of the scraping and squeegee member of the device enlarged over the corresponding illustration in Fig. 1, and up to full size of the commercial embodiment;

Fig. 4 is taken along the lines 4—4 of Fig. 3 and shows the scraping and squeegee device in use; and Figs. 5 and 6 show the scraping and squeegee device in different modes of use.

This invention provides an improved surface cleaning device for removing snow, moisture, etc., from automobile windshields and windows, and the like. The invention includes a long handled brush having a removable scraping member supported at one end thereof, which member may be used mounted on the handle or separately. The scraping member comprises a handle portion and a beveled scraping edge. A series of raised rib portions are provided transverse of the beveled edge, and these terminate short of that edge. There is also a slot between the beveled edge and the ends of the ribbed portions in which a pliant member is disposed. The edge of this pliant member runs parallel to the beveled edge and terminates intermediate the beveled edge and the ends of the rib portions, so that by holding the scraping member at a comparatively large angle to a surface, the pliant member may be used for squeegeeing but the ribbed portions may be used for raking to break up ice or the like when the device is held at a somewhat smaller angle to the surface. By overturning the scraping member, the beveled edge may then be employed for a scraping operation, when such is desirable.

In the drawing there is shown the complete surface cleaning device 10 including a handle 12 on one end of which is disposed a brush 14. The brush 14 is useful principally for removing loose snow from auto windows, and the automobile body itself. A flexible plastic covering 16 may be provided with an open end 17 and a slotted portion 19 so that this cover may be pulled along the handle to expose the brush or cover the same when not in use. Such a plastic cover would tend to confine any moisture remaining in the brush after use when the device is stored in the automobile.

My invention is principally concerned with the scraping member 24 which utilizes the brush handle 12, and is removably mounted on the end thereof so that such scraping member can be readily manipulated over the entire expanse of an automobile windshield and rear window, or the like. Member 24 may be formed of molded plastic or some similar material, and this member includes an enlarged rim section 26 surrounding the major portion of the contour thereof. There is also a relatively thin portion 28 of reduced thickness which fits into slot 29. The portion 28 on each side could also be characterized as ribs or tongues to fit into the corresponding slots in the handle for the tool. A raised section or protrusion 30 integral with portion 28 is formed to engage an associated notch 32 in the handle 12 (Fig. 4). Section 30 tends to maintain member 24 in position on handle 12 against easy removal, but with a slight pull the member 24 may be detached from the handle for manual use as a separate article. An aperture 35 may be provided in the handle 12 to hang the complete device for storage purposes. The member 24 may be about 4½ inches long and 2¾ inches across so that it may conveniently be held in the hand and easily used on small or curved surfaces.

The outer end portion of the scraping member 24 transverse of the handle 12 includes a beveled or sharpened scraping edge 40 and a series of raised rib sections 42. The ends of rib sections 42, which are sharp corrugations, terminate short of the beveled edge 40 and are spaced therefrom to form a slot 45. A flexible or pliant squeegee member 48 is supported in the slot 45. Member 48 may be formed of rubber or some similar material. It may also be seen that beveled edge 40 is slanted toward member 48 and that squeegee member 48 has an edge parallel to edge 40 terminating intermediate edge 40 and rib sections 42.

Fig. 4 shows the scraping member 24 supported by handle 12 and in the process of scraping or raking ice collection 55 from the surface 57. As may be noted from Fig. 2, the raised rib sections 42 possess some degree of sharpness and form a corrugated edge which is particularly adapted to break up ice, as shown in Fig. 4.

Fig. 5 illutrates scraping member 24 disposed at a somewhat greater angle to surface 57 than is shown in Fig. 4 and it may be noted that at this angle the squeegee member 48 is in contact with the surface. This operation may be carried out, of course, to remove moisture or dirt from the surface by squeegeeing it across the surface 57.

By pivoting scraping member 24 through a somewhat greater angle than the change from Fig. 4 to Fig. 5, or by turning the member over, it is possible to bring the beveled edge 40 into contact with surface 57 as shown in Fig. 6. Edge 40 is a straight, sharp, chisel-like edge, and is useful for removing foreign matter, such as snow 60 shown on surface 57. As previously pointed out, the scraping member 24 may be used either when supported by the handle 12, or as a separate device held in the operator's hand for any of the operations illustrated in Figs. 4–6. When held in the hand as a separate device, the knurled or beaded edge 65 aids in obtaining a firm grasp.

This invention provides, therefore, a very simple surface cleaning device for manually scraping or squeegeeing or raking foreign matter, such as snow or ice, from a surface. It is particularly adapted to remove all types of such material from the window glass of automobiles with a minimum of time and effort. As is apparent from the previous description, the scraping member may be quickly and efficiently changed among its different modes of operation by mere selection of the angle at which the member subtends with respect to a surface to be cleaned.

What is claimed is:

1. A scraper and squeegee for removing foreign matter from surfaces, including an integral plastic member with a handle portion having an edge constructed to facilitate grasping the same, a straight portion with a sharpened edge transverse of said handle portion, a series of raised rib sections extending in a direction across said straight portion with ends terminating short of said straight portion and spaced therefrom by a retainer slot, and a pliant squeegee member supported in said retainer slot, said pliant squeegee member having an edge parallel with said straight portion and terminating intermediate said straight portion and said rib sections, said straight portion being beveled toward said pliant squeegee member in said retainer slot, whereby the angle at which said integral plastic member is supported against a surface to be cleaned determines which of said straight portion, said pliant squeegee member, and said rib sections is in contact with such surface for scraping or wiping purposes.

2. A scraper and squeegee for removing foreign matter from windows and the like including in combination, an elongated handle having a locking portion at one end thereof, a scraping member having a handle section with a portion adapted to be removably retained by said locking portion, said handle section being elongated to facilitate grasping when said scraping member is removed from said elongated handle, said scraping member having a straight beveled edge opposite and transverse to said handle section and a series of raised rib sections transverse of and terminating short of said straight beveled edge, said scraping member further having a retainer slot poistioned intermediate said rib sections and said beveled edge, and a pliant squeegee member supported in said retainer slot with an edge of said pliant squeegee member parallel with said straight beveled edge and terminating intermediate said beveled edge and said rib sections whereby said straight edge, said rib sections and said pliant squeegee member may be used respectively for scraping, rasping and squeegeeing foreign matter from a window and the user may manipulate said scraping member by said elongated handle and by said handle section with said scraping member removed from said elongated handle.

References Cited in the file of this patent

UNITED STATES PATENTS

| | | |
|---|---|---|
| D. 156,638 | Lifshutz et al. | Dec. 27, 1949 |
| D. 170,460 | Hauser | Sept. 22, 1953 |
| 412,002 | Schroen | Oct. 1, 1889 |
| 1,541,088 | Whitenack | June 9, 1925 |
| 1,749,049 | Turner | Mar. 4, 1930 |
| 2,618,005 | Harshbarger | Nov. 18, 1952 |
| 2,676,348 | Brody et al. | Apr. 27, 1954 |